Patented Mar. 4, 1941

2,233,502

UNITED STATES PATENT OFFICE 2,233,502

COMPOUNDS OF THE ANTHRAQUINONE SERIES

Alexander J. Wuertz, Villa Monterey, Del., and William L. Rintelman, Elmer, N. J., assignors to E. I. du Pont de Nemours & Company, Wilmington, Del., a corporation of Delaware No Drawing. Application October 21, 1938, Serial No. 236,294

5 Claims. (Cl. 260—384)

This invention relates to the preparation of new compounds of the anthraquinone series which are especially useful as intermediates in the preparation of new and valuable dyestuffs.

According to the present invention halogen-containing phthalic anhydride or phthalic acids are condensed with diphenyl or para-halogen-diphenyl by the known Friedel-Crafts reaction to give new halogen-containing phenyl-2-benzoyl-benzoic acids. These compounds on ring-closure give new chlorine-containing phenylanthraquinone compounds which, because of the presence of the reactive halogen atoms, may be further condensed to give valuable dyestuffs, (see copending application U. S. Serial No. 236,295).

Any of the mono-, di-, tri-, or tetrahalogen phthalic anhydrides or phthalic acids may be employed, as more fully illustrated in the specific examples. The invention contemplates the preparation, broadly, of new phenyl anthraquinone compounds carrying at least one halogen atom in the phenyl ring of the anthraquinone nucleus opposite to that to which the phenyl group is attached. The invention contemplates more particularly the preparation of new polyhalogen-2-phenylanthraquinones, in which at least one halogen atom is contained in the 4'-position of the phenyl ring of the 2-phenylanthraquinone and at least one further halogen atom is present in one of the positions 5, 6, 7 and 8. The Friedel-Crafts condensation reaction is preferably carried out in a high boiling inert organic solvent, such as orthodichlorobenzene, chlorobenzene, toluene, etc., and where the halogen phthalic acids are employed they are first heated in the organic solvents at temperatures ranging from 120 to 175° C. until complete dehydration is effected, then the diphenyl compound is added and the condensation is carried out in the same solvent in which the dehydration takes place.

The following examples are given to illustrate the invention. The parts used are by weight.

Example 1

245 parts of 4-bromophthalic acid, (M. P. 163–167° C.), are suspended in 1225 parts of o-dichlorobenzene and heated at a temperature between 120 and 175° C. until water is no longer liberated. The 4-bromophthalic acid dissolves in the hot solvent only after being dehydrated to the anhydride. The solution is now cooled to 15 to 16° C. and 178 parts of p-chlorodiphenyl, and 292 parts of dry aluminum chloride lumps are added. The mass is agitated for about 10 hours, the temperature being allowed to rise to 20 to 25° C. during the stirring and finally heated to 75 to 80° C. and held 1 hour or longer to complete the reaction. When the evolution of hydrochloric acid gas has ceased, the green solution is cooled to 20 to 25° C. and poured into an agitated mixture of ice and water containing about 100 parts of 30% hydrochloric acid. The entire emulsion is diluted to 10,000 parts with water and stirred for about 1 hour or until two layers are formed when the agitation is stopped. The supernatant aqueous layer is then decanted off and the oily layer washed several times by agitation and decantation using fresh water. When thoroughly washed, a solution of 50 parts of caustic soda in 1000 parts of water is added and the solvent removed by steam distillation. The remaining aqueous solution is now filtered to remove the insoluble impurities and then slowly run into a well agitated mixture of ice and water containing 200 parts of 30% hydrochloric acid. A small amount of ice should be present during the precipitation. The resulting white precipitate is filtered off by suction, washed acid-free and dried.

A mixture of 4''-chloro-4'-phenyl-2-benzoyl-4- and 5-bromobenzoic acids is obtained in an almost quantitative yield. The product has a melting range of 172 to 190° C. After three successive recrystallizations from toluene, glacial acetic acid and toluene in turns, the melting range is raised to 205 to 210° C. The product dissolves in strong sulfuric acid with a bluish red color when viewed by transmitted light and purple with reflected light.

Example 2

100 parts of the mixture of 4''-chloro-4'-phenyl-2-benzoyl-4- and 5-bromobenzoic acid described in Example 1 are dissolved in 400 parts of 96 to 98% sulfuric acid and heated at 125° C. until a test shows complete ring-closure. About 4 hours' time is required. The cooled acid solution is drowned in water, filtered and washed acid-free.

It is not necessary, however, to drown the reaction mass in order to isolate the compound for it crystallizes out of the acid on cooling and may be recovered by filtration of the acid magma. In this manner a higher proportion of the one isomer, (4'-chloro-2-phenyl-6-bromoanthraquinone) is obtained. The melting point of the crude mixture of isomers, obtained by drowning the total mass, is 175 to 185° C., while that isolated by crystallization from the concentrated sulfuric acid is 190 to 210° C. On crystallization of the latter material from 10 parts of nitrobenzene, the latter melting point of the 4'-chloro-2-phenyl-6-bromoanthraquinone may be raised to 210 to 220° C. It dissolves in 96% sulfuric acid with a red color, in 100% sulfuric acid it gives a bluer red. In thionyl chloride it dissolves to give an orange color.

The material from the concentrated sulfuric acid filtrate, when twice recrystallized from 5 parts o-dichlorobenzene, melts at 220 to 228° C.

Example 3

If 3-chlorophthalic acid or anhydride is substituted for the bromophthalic acid, in Example 1, a mixture of 3- and 6-4''-dichloro-4'-phenyl-2-benzoylbenzoic acids is obtained. The mixture has a melting range of 180 to 185° C. which on repeated recrystallizations from toluene, glacial acetic acid, and again toluene in turns, is raised to 195 to 198° C. It dissolves in strong sulfuric acid with a red coloration.

Instead of precipitating the alkaline solution, obtained after distillation of the solvent, with dilute hydrochloric acid, the sodium salts of the mixed acids may be thrown out from the hot solution, by the addition of 3 to 5% sodium chloride. They crystallize in the form of long clear needles and may be filtered off and washed.

Example 4

100 parts of the mixture of the dichlorophenyl-o-benzoylbenzoic acids, obtained as in Example 3, are dissolved in 500 parts of 96 to 97% sulfuric acid and held at 125° C. until ring-closure is complete (about 6 hours). The ring-closed product is isolated by drowning in cold water and filtering. The crude mixture is a greenish yellow compound which melts at 180 to 185° C. After being twice recrystallized from 5 parts of o-dichlorobenzene, the 4'-5-dichloro-2-phenylanthraquinone melts at 186.4 to 187.6° C.

Example 5

10 parts of the crude phenylbenzoylbenzoic acid obtained as in Example 3, are suspended in 5 parts of o-dichlorobenzene (dry) with 1 part of thionyl chloride and slowly heated to a boil (over a 1 hour period). The excess thionyl chloride is allowed to slowly distill off. The solution, after being heated for a short time, becomes deep red violet in color. It is heated at a boil until the color changes to a yellow and most of the thionyl chloride boiled off. The final temperature is about 175 to 180° C. The yellow solution is cooled and the ring-closed product recovered by steam distillation and filtration. If purified intermediate is used, the ring-closed product crystallizes from the cool solution in the form of yellow crystals. The product is the same as obtained in Example 4.

Example 6

If 3,6-dichlorophthalic acid or anhydride is used as in Example 1, 4'',3,6-trichloro-4'-phenyl-2-benzoylbenzoic acid is obtained in an almost quantitative yield. The product melts after one crystallization from dichlorobenzene at 226.5 to 227.6° C. It dissolves in 95% sulfuric acid with a green coloration which gets bluer on warming. At 100° C. the acid solution is blue, at 170° C. violet. Like the products described in Example 3 it may be salted from the alkaline solution by adding sodium chloride until the concentration is 5% sodium chloride. It crystallizes in clear white crystals, which may be filtered off and washed with salt solution and then converted to the free acid by treatment with hydrochloric or sulfuric acid.

Example 7

50 parts of 4'',3,6-trichloro-4'-phenyl-2-benzoylbenzoic acid, obtained as in Example 6, are dissolved in 500 parts of nitrobenzene at 200° C., then cooled to 160° C. At this temperature 50 parts of phosphorus pentoxide are added and heating continued for ¼ hour. The solution which at first is a deep blue, changes to a violet and finally becomes yellow. The phosphorus residues are removed by filtering the hot solution and the 4',5,8-trichloro-2-phenylanthraquinone allowed to crystallize from the filtrate. It is a yellow crystalline body which melts at 238 to 239° C. It vats very poorly with a red vat. In 95% sulfuric acid, it forms a violet solution.

Example 8

3,4,5,6-tetrachlorophthalic anhydride (or acid) is reacted in the same manner as the bromophthalic acid in Example 1. After isolating and washing the oily layer, which in this case is very viscous and heavy, it is made alkaline and steam distilled. The sodium salt of the 3,4,5,6-4''-pentachloro-4'-phenyl-2-benzoylbenzoic acid is precipitated during the distillation of the solvent. It is very insoluble in water and may be filtered off and washed alkali-free. The crystals are large heavy needles which may be decomposed by heating with hydrochloric or sulfuric acid to give the free pentachlorophenylbenzoylbenzoic acid. This compound, after recrystallization from 5 parts of o-dichlorobenzene, melts at 210 to 211° C. In nitrobenzene with phosphorus pentoxide it forms a bright blue solution which when heated to 160° C. gives 4',5,6,7,8-pentachloro-2-phenylanthraquinone which melts at 245–247° C.

Example 9

25 parts of penta-chlorophenyl-2-benzoylbenzoic acid of Example 8 are dissolved in 200 parts of nitrobenzene and heated to 160° C., then at this temperature 25 parts of phosphorus pentoxide are slowly added and the heating continued for several hours longer. The solution is then filtered hot, to remove the phosphorus residues, and the filtrate allowed to cool. The yellow needles which separate from the filtrate are filtered off, washed with alcohol and dried. The product which is the 4'-chloro-2-phenyl-5,6,7,8-pentachloroanthraquinone melts at 245 to 247° C. It vats with a reddish colored vat which turns quite brown on long standing. The product dissolves in 100% sulfuric acid with a red violet coloration. It is quite insoluble in 96% sulfuric acid.

*Example 10*

Tetrachlorophthalic anhydride and diphenyl when reacted as in Examples 1 and 8 give the sodium salt of 3,4,5,6-tetrachloro-4'-phenyl-2-benzoylbenzoic acid in the form of long heavy needles. The free acid is obtained by treating with warm dilute mineral acids and melts at 198 to 200° C. after recrystallization from 8 parts of glacial acetic acid.

As illustrated above, the ring-closure of the phenylbenzoylbenzoic acid may be carried out in strong sulfuric acid or in a solvent with compounds such as thionyl chloride, phosphorus pentoxide, etc. It is understood that both the Friedel-Crafts condensation reaction and the ring-closure of the phenylbenzoylbenzoic acid may be carried out by any of the known methods for preparing anthraquinone compounds by the Friedel-Crafts reaction. By the use of halogen phthalic anhydrides and the halogen-containing diphenyl, applicants have been able to prepare their valuable intermediates in high yield and relatively pure form, whereas by the ordinary substitution methods, such as sulfonation, nitration or chlorination, very impure products are obtained due to the ease with which the phenyl group is substituted.

We claim:

1. The halogen-containing 2-phenylanthraquinone compounds of the formula:

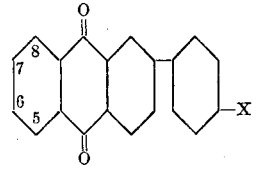

in which X stands for an element of the class consisting of hydrogen, chlorine and bromine and in which at least one of the positions 5, 6, 7 and 8 of the anthraquinone nucleus carries a halogen atom.

2. 4',6-dihalogen-2-phenylanthraquinone.
3. 4',5,6,7,8-pentahalogen-2-phenylanthraquinone.
4. 4',5,8-trihalogen-2-phenylanthraquinone.
5. 4'-chloro-6-bromo-2-phenylanthraquinone.

ALEXANDER J. WUERTZ.
WILLIAM L. RINTELMAN.